United States Patent [19]

Holmes

[11] Patent Number: 5,192,431
[45] Date of Patent: Mar. 9, 1993

[54] FORKLIFT MANIPULABLE, LINED, DISSOLVER FOR TRANSPORTING AND FEEDING CHEMICALS FOR WATER PURIFICATION

[76] Inventor: Norman A. Holmes, 2906 Little Bear, Kingwood, Tex. 77339

[21] Appl. No.: 704,444

[22] Filed: May 23, 1991

[51] Int. Cl.⁵ ............................................. B01D 15/00
[52] U.S. Cl. .................... 210/198.1; 210/205; 210/237; 210/241; 422/37; 422/255; 422/261; 422/279
[58] Field of Search .................... 210/190, 192, 198.1, 210/205, 237, 241, 269, 275; 137/268; 422/37, 255, 261, 279; 55/388

[56] References Cited

U.S. PATENT DOCUMENTS

| | | | |
|---|---|---|---|
| 1,409,248 | 3/1922 | Sevcik | 422/279 |
| 1,624,614 | 4/1927 | McGill | 210/190 |
| 2,771,424 | 11/1956 | Stromquist et al. | 210/190 |
| 2,971,648 | 2/1961 | Lane et al. | 210/193 |
| 2,973,319 | 2/1961 | Porter | 210/190 |
| 3,454,492 | 7/1969 | Gaines | 210/190 |
| 3,767,050 | 10/1973 | Reiner | 210/169 |
| 4,107,044 | 8/1978 | Levendusky | 210/266 |
| 4,659,460 | 4/1987 | Muller et al. | 210/241 |
| 4,826,594 | 5/1989 | Sedman | 210/266 |
| 4,877,525 | 10/1989 | Chapman | 210/289 |

*Primary Examiner*—Peter Hruskoci
*Assistant Examiner*—Robert James Popevics
*Attorney, Agent, or Firm*—Keeling & Assoc.

[57] ABSTRACT

A chemical feed-transport unit for transporting water-treating chemicals and introducing them into a water supply comprises a cylindrical tank with semispherical top and bottom supported on a metal transportable skid. The tank has a flanged top opening with removable cover and a top inlet for introduction of water for flushing and cleaning the tank. The tank has a chemical-resistant, plastic lining to prevent chemical attack to the walls thereof. The bottom of the tank has inlet and outlet openings with valves controlling water flow therethrough and an outlet opening for draining the contents during the flushing and cleaning operation. The supporting metal skid is rectangular in shape with channel members forming the sides and sheet metal plates forming the top and bottom thereof. The edge walls of the skid (walls of the channel members) have slots therein sized and spaced to receive the lifting members of a fork-lift apparatus. Angle or channel steel members are welded to the top of the skid and to the walls of the tank to secure the tank on the skid. In use, pellets or granules of water-treating chemicals, e.g., halogen-releasing chemicals, are filled to about half the depth of the tank. Adjustment of the valves to produce a predetermined, regulated water flow through the tank and its contents regulate the amount of halogen released into the water supply.

2 Claims, 3 Drawing Sheets

5,192,431

FORKLIFT MANIPULABLE, LINED, DISSOLVER FOR TRANSPORTING AND FEEDING CHEMICALS FOR WATER PURIFICATION

BACKGROUND OF THE INVENTION

1. Field of the Invention

This invention relates generally to chemical transport and feeding units and more particularly to a chemical feed-transport unit for transporting water-treating chemicals and introducing them into a water supply.

2. Brief Description of the Prior Art

Devices are known for transporting chemicals and other devices are known for feeding chemicals into water supplies.

Reiner U.S. Pat. No. 3,767,050 discloses a filtration system for liquids having a tank partially filled with sand and arranged for circulation of liquids therethrough. The apparatus is used particularly with cleaning water being introduced into a swimming pool.

Levendusky U.S. Pat. No. 4,107,044 discloses an apparatus for removing dissolved and undissolved impurities from a fluid. The apparatus comprises a tank partially filled with a filter medium and having headers at the top and bottom connected to inlet and outlet conduits respectively.

Sedman U.S. Pat. No. 4,826,594 discloses a portable water conditioning apparatus. The apparatus has a tank with a top inlet and bottom outlet and walls dividing the tank vertically which support treating chemicals. The inner construction is preferable a removable canister which contains the treating chemicals.

The present invention is distinguished over the prior art in general, and these patents in particular by providing a chemical feed-transport unit for transporting water-treating chemicals and introducing them into a water supply which comprises a cylindrical tank with semispherical top and bottom supported on a metal transportable skid. The tank has a flanged top opening with removable cover and a top inlet for introduction of water for flushing and cleaning the tank. The tank has a chemical-resistant, plastic lining to prevent chemical attack to the walls thereof. The bottom of the tank has an inlet opening and outlet opening with valves controlling water flow therethrough and an outlet opening for draining the contents during the flushing and cleaning operation. The supporting metal skid is rectangular in shape with channel members forming the sides and sheet metal plates forming the top and bottom thereof. The edge walls of the skid (walls of the channel members) have slots therein sized and spaced to receive the lifting members of a fork-lift apparatus. Angle or channel steel members are welded to the top of the skid and to the walls of the tank to secure the tank on the skid. In use, pellets or granules of water-treating chemicals, e.g., halogen-releasing chemicals, are filled to the full depth of the tank. Adjustment of the valves to produce a predetermined, regulated water flow through the tank and its contents regulate the amount of halogen released into the water supply.

SUMMARY OF THE INVENTION

It is therefore an object of the present invention to provide a new and improved compact, easily-transportable, DOT approved, tank for transport and feed of water-treating chemicals.

It is another object of this invention is to provide a new and improved compact, easily-transportable, DOT approved, tank for transport and feed of water-treating chemicals which is protected against attack by the chemicals being transported.

Another object of this invention is to provide a new and improved compact, easily-transportable, DOT approved, tank for transport and feed of water-treating chemicals which is skid-mounted for easy transport.

Another object of this invention is to provide a new and improved compact, easily-transportable, DOT approved, tank for transport and feed of water-treating chemicals which is skid-mounted and has slots for receiving the lifting members of a fork lift.

Still another object of this invention is to provide a new and improved compact, easily-transportable, DOT approved, tank for transport and feed of water-treating chemicals which has valves on inlet and outlet conduits for regulating the circulation of water through the chemicals in the tank to regulate the amount of chemicals introduced into the water supply.

Still another object of this invention is to provide a new and improved compact, easily-transportable, DOT approved, tank for transport and feed of water-treating chemicals which has a top opening for introduction of water-treating chemicals and top and bottom openings for flushing and cleaning the tank.

A further object of this invention is to provide an improved compact, easily-transportable, DOT approved, tank for transport and feed of water-treating halogen-releasing chemicals.

Other objects of the invention will become apparent from time to time throughout the specification and claims as hereinafter related.

The above noted objects and other objects of the invention are accomplished by a novel chemical feed-transport unit for transporting water-treating chemicals and introducing them into a water supply which comprises a cylindrical tank with semispherical top and bottom supported on a metal transportable skid. The tank has a flanged top opening with removable cover and a top inlet for introduction of water for flushing and cleaning the tank. The tank has a chemical-resistant, plastic lining to prevent chemical attack to the walls thereof. The bottom of the tank has an inlet opening and outlet opening with valves controlling water flow therethrough and an outlet opening for draining the contents during the flushing and cleaning operation. The supporting metal skid is rectangular in shape with channel members forming the sides and sheet metal plates forming the top and bottom thereof. The edge walls of the skid (walls of the channel members) have slots therein sized and spaced to receive the lifting members of a fork-lift apparatus. Angle or channel steel members ar welded to the top of the skid and to the walls of the tank to secure the tank on the skid. In use, pellets or granules of water-treating chemicals, e.g., halogen-releasing chemicals, are filled to the full depth of the tank. Adjustment of the valves to produce a predetermined, regulated water flow through the tank and its contents regulate the amount of halogen released into the water supply.

DESCRIPTION OF THE PREFERRED EMBODIMENT

Figure 1:
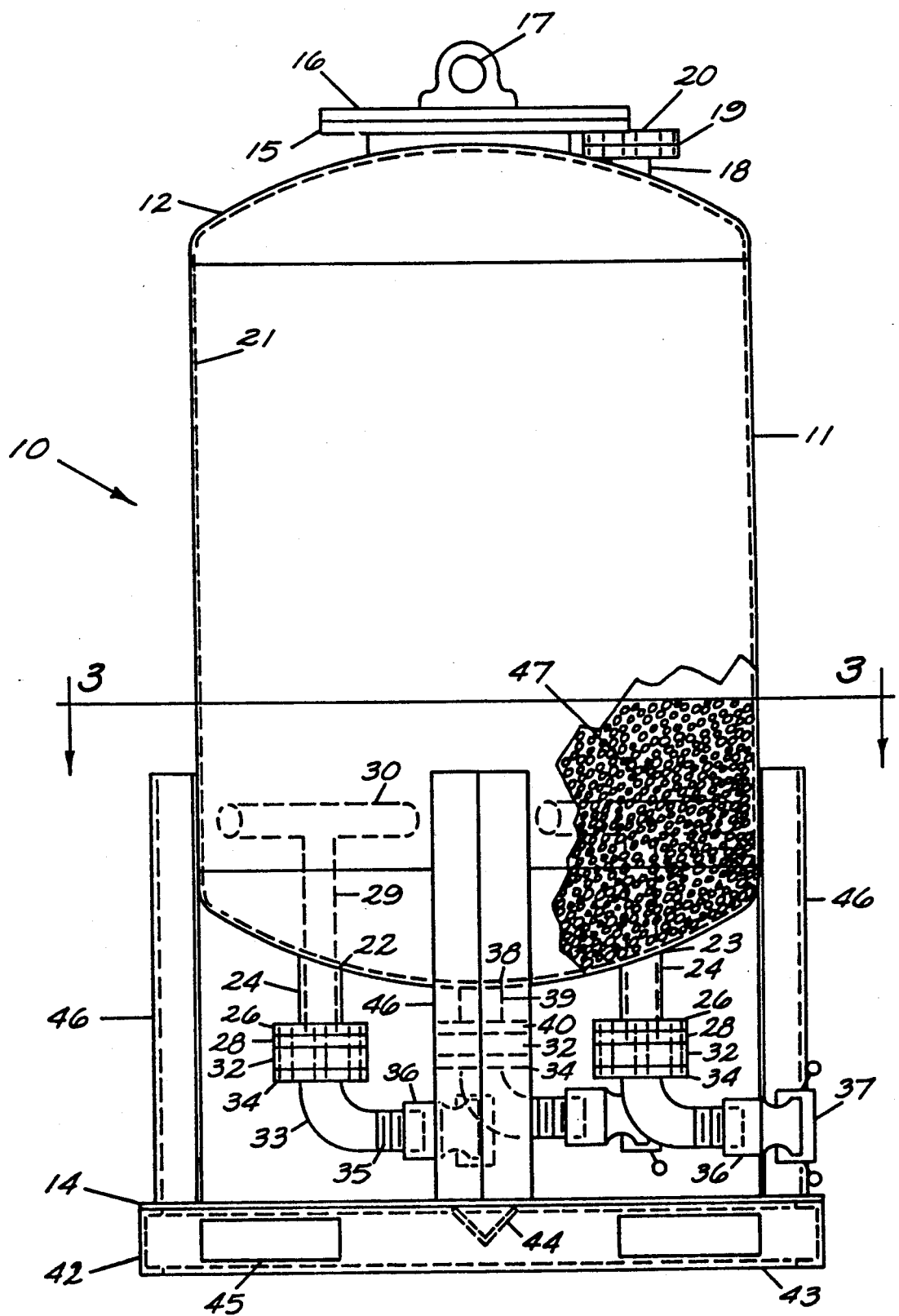
FIG. 1 is a front elevation of a chemical feed-transport unit illustrating a preferred embodiment of this invention.
Figure 2:
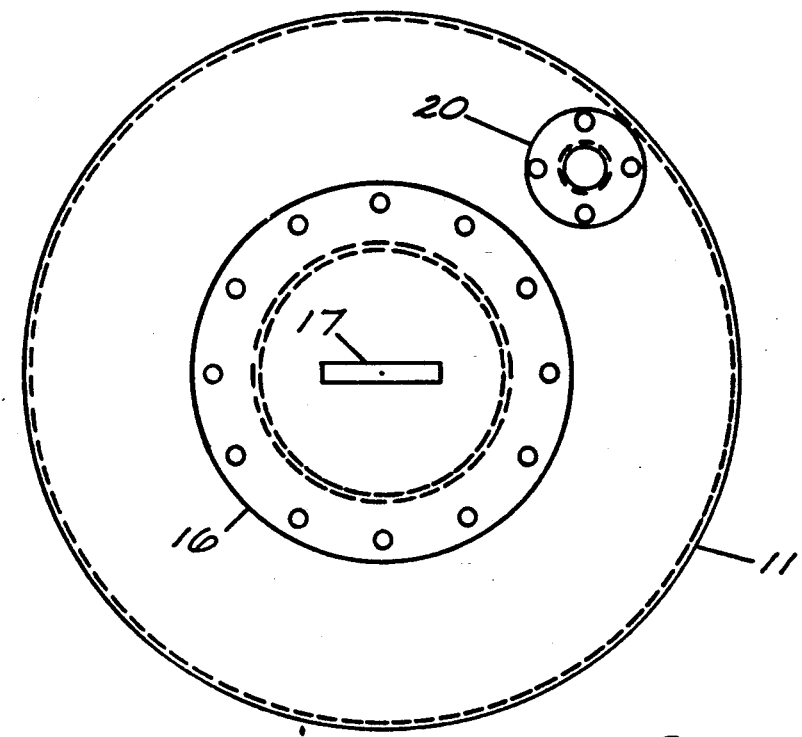
FIG. 2 is a top plan view of the embodiment shown in FIG. 1.
Figure 3:
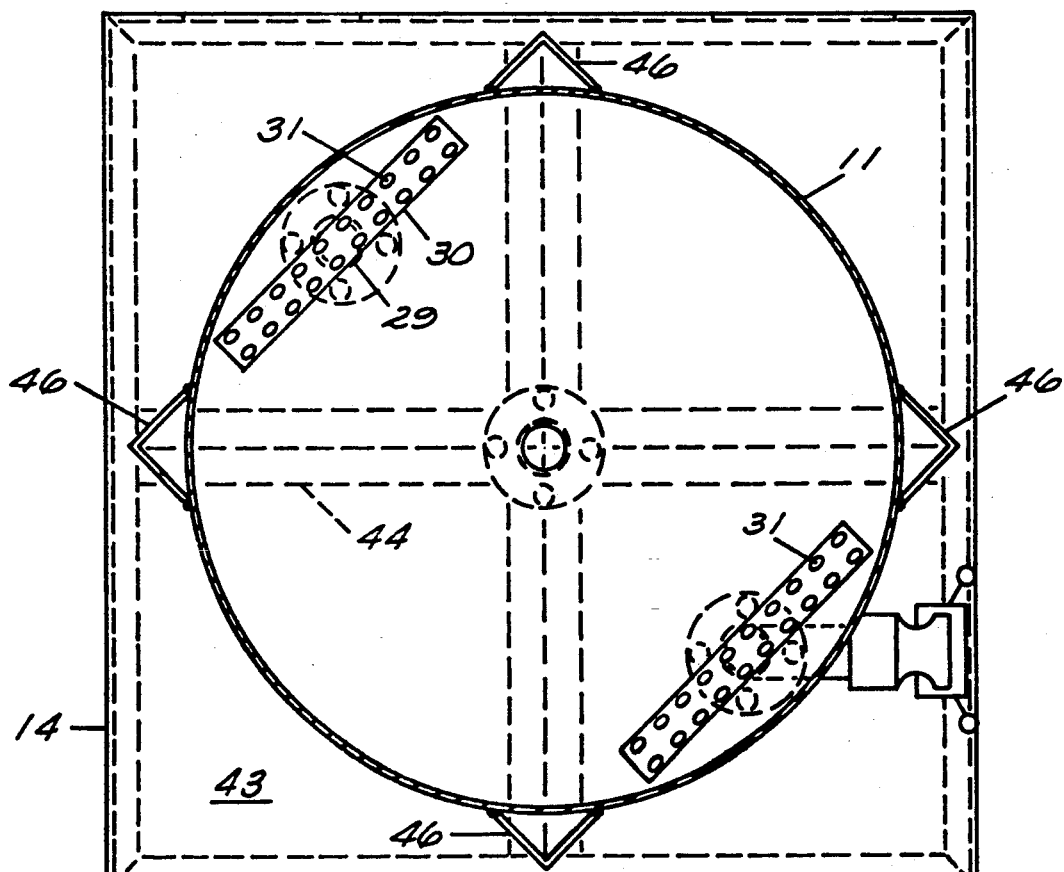
FIG. 3 is a sectional view on the line 3—3 of FIG. 1 showing the location of the outlet and inlet headers.
Figure 4:
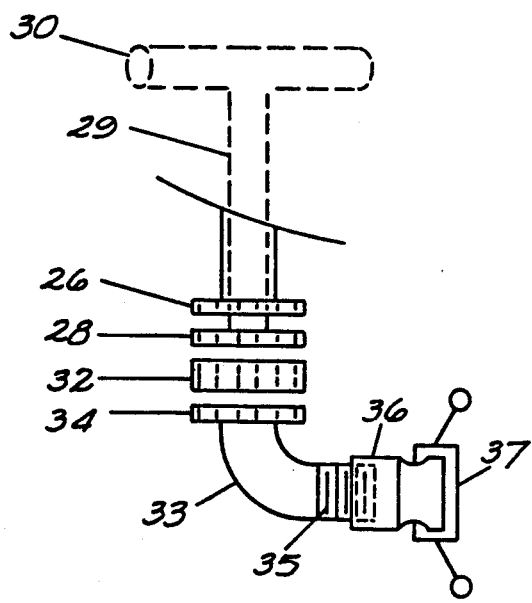
FIG. 4 is a detail, partially exploded view of the inlet and outlet connections, valves and headers.
Figure 5:
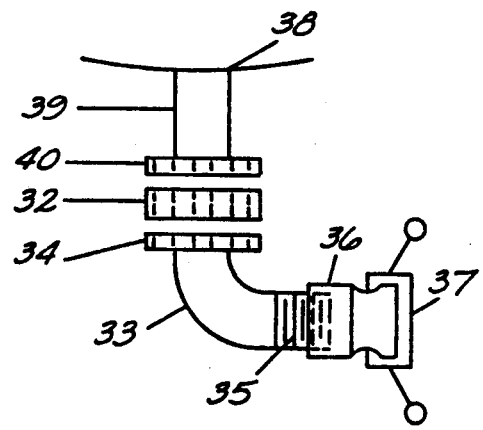
FIG. 5 is a detail, partially exploded view of the bottom outlet drain connections.
Figure 6:
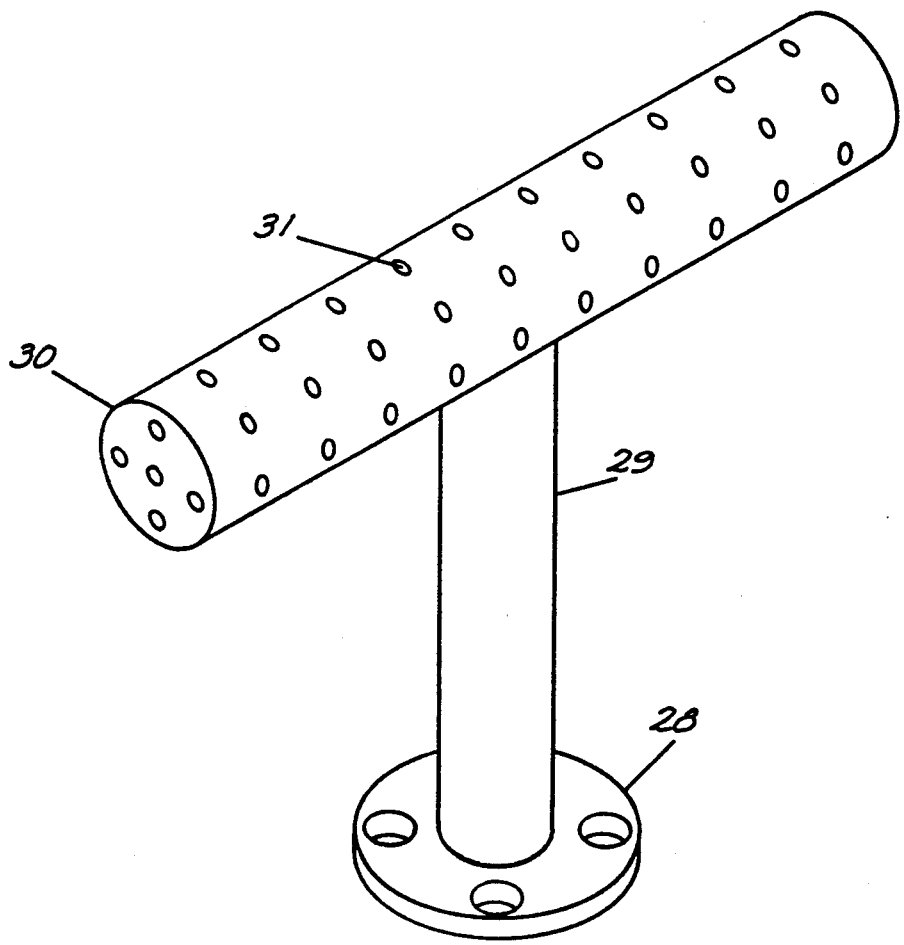
FIG. 6 is a detail view in elevation of the outlet and inlet headers.

Referring to the drawings by numerals of reference, there is shown a chemical feed-transport unit 10 for transporting water-treating chemicals and introducing them into a water supply.

Chemical feed-transport unit 10 comprises a cylindrical tank or shell 11 with semispherical top head 12 and bottom head 13 supported on a metal transportable skid 14. The tank 11 has a flanged top opening 15 with removable blind flange or cover 16. Cover 16 has a lifting eye 17 secured thereon. Top head 12 has a top inlet nipple 18 with a flange 19 secured thereon and closed by a blind flange or closure 20 for introduction of water for flushing and cleaning the tank.

The tank 11 and heads 12 and 13 have a chemical-resistant, plastic (45 mil) lining 21 to prevent chemical attack to the walls thereof. The bottom of tank 11 has an inlet opening 22 and an outlet opening 23 with nipples 24 and 25 secured therein. A flange 26 is secured on the lower end of the nipples 24 and 25. A standpipe 29 has a flange 28 at its lower end and a header 30 at its upper end. Header 30 has closed ends and holes or perforations 31 providing for water distribution.

Standpipe 29 extends through nipple 24 or 25 with flange 28 abutting flange 26. A butterfly valve 32 is positioned against flange 28. An elbow 33 has a flange 33 at one end and is threaded at 35 at the other end. Flanges 26, 28 and 34 and valve 32 are aligned and secured together by bolts (not shown).

Outlet opening 23 has nipple 25 and flange 27 with standpipe 29 extending through nipple 25 with flange 28 abutting flange 26. Butterfly valve 32 is positioned against flange 28. An elbow 33 has flange 33 at one end and is threaded at 35 at the other end. Flanges 26, 28 and 34 and valve 32 are aligned and secured together by bolts (not shown). Valves 32 in the inlet and outlet lines control water flow therethrough. The threaded end 35 of elbow 33 has a quick-disconnect fitting 36 threaded thereon and a dust cover 37 which closes the elbow when it is not connected in a water system.

The bottom of tank 11 has an outlet opening 38 with a nipple 39 secured therein with a flange 40 at the other end for draining the contents during the flushing and cleaning operation. Outlet opening 38 has nipple 39 and flange 40 abutting a butterfly valve 32. An elbow 33 has flange 33 at one end and is threaded at 35 at the other end. Flanges 26 and 34 and valve 32 are aligned and secured together by bolts (not shown). Valve 32 in bottom outlet line 39 controls water flow therethrough during the flushing and cleaning operation. The threaded end 35 of elbow 33 has a quick-disconnect fitting 36 threaded thereon and a dust cover 37 which closes the elbow when the tank is not being flushed.

The supporting metal skid 14 is rectangular in shape with channel members 42 forming the sides and sheet metal plate 43 forming the top thereof. Top plate 43 is reinforced at the middle by angle iron 44. The edge walls 42 of the skid (walls of the channel members) have slots 45 therein sized and spaced to receive the lifting members of a suitable fork-lift apparatus. Angle or channel steel members 46 are welded to the top of the skid and to the walls of the tank to secure the tank on the skid.

Inlet opening 22 has tube 29 extending to header tube 30 as previously described. Outlet opening 23 has tube 29 extending to another header tube 30 as previously described. In use, pellets or granules 47 of water-treating chemicals, e.g., halogen releasing chemicals, are filled to the full depth of the tank 11. Adjustment of the valves 32 to produce a predetermined, regulated water flow through the tank and its contents regulates the amount of halogen released into the water supply.

OPERATION

While the operation of this invention should be obvious from the foregoing description, it will be restated for clarity.

Chemical feed-transport unit 10 comprising cylindrical tank 11 with semispherical top 12 and bottom 13 is supported on a metal transportable skid 14. The supporting metal skid 14 is rectangular in shape with channel members 42 forming the sides and sheet metal plate 43 forming the top thereof. The edge walls 42 of the skid (walls of the channel members) have slots 45 therein sized and spaced to receive the lifting members of a suitable fork-lift apparatus. Angle or channel steel members 46 are welded to the top of the skid and to the walls of the tank to secure the tank on the skid. A fork lift truck or equivalent device has its lifting members inserted into slots 45 and the entire structure lifted for transport to a transport vehicle or to the ultimate destination of the apparatus.

The tank flanged top opening 15 has removable cover 16 removed or installed by lifting eye 17 for filling the tank 11 with the pellets or granules 47 of water-treating chemicals, e.g., halogen-releasing chemicals, to the full depth of the tank 11. Cover 16 is removable and may be loosely supported on the top opening by its weight or may be bolted in place through peripheral holes on the cover 16 and top flange. The chemical-resistant, plastic lining 21 prevents chemical attack to the walls of tank 11.

The inlet opening has an inlet tube or standpipe extending to a header tube 29 having holes 30 for distributing water flow. The outlet opening has an outlet tube or standpipe extending to header tube 30 having holes 31 for distributing water flow. The valves 32 control water flow through the bed of water-treating pellets or granules 47 to regulate and predetermine the amount of chemical dissolved and thus regulates the amount of chemical introduced into the water supply.

Periodically, the tank 11 is flushed and cleaned by removing the cover from top opening 18 and introducing water therethrough which is drained from the bottom of the tank 11 through outlet 38 and valve 32.

While this invention has been shown fully and completely with special emphasis on certain preferred embodiments, it should be understood that within the scope of the appended claims the invention may be practiced otherwise than as specifically described herein.

What is claimed is:

1. A portable dissolver for transporting water-purifying chemicals and dissolving and introducing them into a water supply comprising a cylindrical tank with semispherical top and bottom members, a metal transportable skid positioned to support said tank, said metal skid being rectangular in shape and constructed for transport by a fork-lift, a chemical-resistant, plastic lining on substantially the entire inner surfaces of said tank to prevent chemical attack thereto, pellets or granules of water-purifying chemicals substantially filling said tank, an inlet opening and an outlet opening on the bottom of said tank for connection to a water supply, said bottom inlet opening comprising a first standpipe with a header at one end thereof comprising a closed end tube with holes for facilitating water flow therethrough, a valve controlling flow through said inlet opening, said bottom outlet opening comprising a standpipe with a header at one end thereof comprising a closed end tube with holes for facilitating water flow therethrough, said inlet and outlet headers being positioned on opposite sides of said tank, parallel to each other and at substantially the same level in said tank a predetermined distance above the bottom, a valve controlling flow through said outlet opening, said valves controlling water flow through the contents of said tank to determine the rate of dissolution of water-purifying chemicals and rate of introduction of said chemicals into said water supply, said tank having a flanged top opening with removable cover for introduction of said water-purifying chemicals, a top tank inlet for introduction of water for flushing and cleaning said tank, and a bottom tank outlet for removal of water used in flushing and cleaning said tank, 2. A portable dissolver according to claim 1 in which said metal skid is constructed of angle or channel steel members welded to the top of said skid and to the walls of said tank to secure said tank on said skid, said metal skid being rectangular in shape having channel members forming the sides and sheet metal plates forming the top and bottom thereof, and the edge walls of said channel members having slots therein sized and spaced to receive the lifting members of a fork-lift.

* * * * *